US012434943B2

(12) United States Patent
Roberts et al.

(10) Patent No.: US 12,434,943 B2
(45) Date of Patent: Oct. 7, 2025

(54) BEAM CLIMBER ACTIVE BRAKE HEALTH MONITORING SYSTEM

(71) Applicant: Otis Elevator Company, Farmington, CT (US)

(72) Inventors: Randy Roberts, Hebron, CT (US); Edward Piedra, Chicopee, MA (US); Sam Thieu Wong, Bridgeport, CT (US); James L. Hubbard, Kensington, CT (US)

(73) Assignee: OTIS ELEVATOR COMPANY, Farmington, CT (US)

( * ) Notice: Subject to any disclaimer, the term of this patent is extended or adjusted under 35 U.S.C. 154(b) by 1369 days.

(21) Appl. No.: 16/944,786

(22) Filed: Jul. 31, 2020

(65) Prior Publication Data

US 2022/0033219 A1 Feb. 3, 2022

(51) Int. Cl.

| | |
|---|---|
| ***B66B 5/00*** | (2006.01) |
| ***B66B 5/16*** | (2006.01) |
| ***B66B 7/04*** | (2006.01) |

(52) U.S. Cl.

CPC .......... *B66B 5/0031* (2013.01); *B66B 5/0025* (2013.01); *B66B 5/16* (2013.01); *B66B 7/046* (2013.01)

(58) Field of Classification Search

CPC ....... B66B 5/0031; B66B 5/0025; B66B 5/16; B66B 7/046; B66B 1/3476; B66B 9/02; B66B 5/0037; B66B 5/0018; B66B 5/02; B66B 11/0438; B66B 1/32; B66B 5/18

See application file for complete search history.

(56) References Cited

U.S. PATENT DOCUMENTS

| | | | | |
|---|---|---|---|---|
| 2007/0000735 | A1* | 1/2007 | Hanninen | B66B 5/0037 187/391 |
| 2017/0088398 | A1* | 3/2017 | Kuczek | B66B 5/18 |
| 2017/0107078 | A1* | 4/2017 | Hu | B66B 5/04 |
| 2019/0077636 | A1* | 3/2019 | Bhaskar | B66B 9/003 |

(Continued)

FOREIGN PATENT DOCUMENTS

| | | | |
|---|---|---|---|
| CN | 1910103 | A | 2/2007 |
| CN | 101128381 | A | 2/2008 |

(Continued)

OTHER PUBLICATIONS

Chinese Office Action for Application No. 202110800396.8; Issued Feb. 11, 2023; 7 Pages.

*Primary Examiner* — Jeffrey Donels
(74) *Attorney, Agent, or Firm* — CANTOR COLBURN LLP

(57) ABSTRACT

An elevator system including: an elevator car configured to travel through an elevator shaft; a first guide beam extending vertically through the elevator shaft, the first guide beam including a first surface and a second surface opposite the first surface; a beam climber system configured to move the elevator car through the elevator shaft, the beam climber system including: a first wheel in contact with the first surface; and a first electric motor configured to rotate the first wheel; a first motor brake mechanically connected to the first electric motor, the first motor brake configured to slow the elevator car; and a brake condition based monitoring system configured to detect when the first motor brake is dragging.

16 Claims, 4 Drawing Sheets

(56) References Cited

U.S. PATENT DOCUMENTS

| | | | | |
|---|---|---|---|---|
| 2019/0077637 | A1* | 3/2019 | Bhaskar | B66B 9/003 |
| 2019/0177114 | A1* | 6/2019 | Fargo | B66B 5/0031 |
| 2019/0359447 | A1* | 11/2019 | Hakala | B66B 1/3461 |
| 2020/0180909 | A1* | 6/2020 | Schulz | B66B 5/18 |

FOREIGN PATENT DOCUMENTS

| | | | |
|---|---|---|---|
| CN | 104010958 | A | 8/2014 |
| CN | 104176576 | A | 12/2014 |
| CN | 109466995 | A | 3/2019 |
| EP | 3466857 | A1 * | 4/2019 |
| JP | 2004018235 | A | 1/2004 |

* cited by examiner

BEAM CLIMBER ACTIVE BRAKE HEALTH MONITORING SYSTEM

BACKGROUND

The subject matter disclosed herein relates generally to the field of elevator systems, and specifically to a method and apparatus for detecting brake health on brakes of propulsion systems for an elevator car.

Elevator cars are conventionally operated by ropes and counter weights, which typically only allow one elevator car in an elevator shaft at a single time.

BRIEF SUMMARY

According to an embodiment, an elevator system is provided. The elevator system including: an elevator car configured to travel through an elevator shaft; a first guide beam extending vertically through the elevator shaft, the first guide beam including a first surface and a second surface opposite the first surface; a beam climber system configured to move the elevator car through the elevator shaft, the beam climber system including: a first wheel in contact with the first surface; and a first electric motor configured to rotate the first wheel; a first motor brake mechanically connected to the first electric motor, the first motor brake configured to slow the elevator car; and a brake condition based monitoring system configured to detect when the first motor brake is dragging.

In addition to one or more of the features described herein, or as an alternative, further embodiments may include that the brake condition based monitoring system is configured to detect when the first motor brake is dragging based upon at least a torque of the first electric motor.

In addition to one or more of the features described herein, or as an alternative, further embodiments may include a floor pressure sensor configured to determine a center of gravity of the elevator car, wherein the brake condition based monitoring system is configured to detect when the first motor brake is dragging based upon at least the torque of the first electric motor and the center of gravity.

In addition to one or more of the features described herein, or as an alternative, further embodiments may include that the brake condition monitoring system is configured to normalize the torque of the first electric motor based on the center of gravity of the elevator car.

In addition to one or more of the features described herein, or as an alternative, further embodiments may include that the beam climber system further includes: a second wheel in contact with the second surface; a second electric motor configured to rotate the second wheel; and a second motor brake mechanically connected to the second electric motor, the second motor brake configured to slow the elevator car, wherein the brake condition based monitoring system is configured to detect when the second motor brake is dragging.

In addition to one or more of the features described herein, or as an alternative, further embodiments may include that the brake condition based monitoring system is configured to detect when the second motor brake is dragging based upon at least a torque of the second electric motor.

In addition to one or more of the features described herein, or as an alternative, further embodiments may include a first guide rail extending vertically through the elevator shaft, wherein the beam climber system further includes: a first guide rail brake operably connected to the first guide rail, wherein the brake condition monitoring system is configured to detect when the first guide rail brake is dragging based upon at least a torque of the first electric motor and the torque of the second electric motor.

In addition to one or more of the features described herein, or as an alternative, further embodiments may include a second guide beam extending vertically through the elevator shaft, the second guide beam including a first surface of the second guide beam and a second surface of the second guide beam opposite the first surface of the second guide beam, wherein the beam climber system further includes: a second wheel in contact with the second surface of the first guide beam; a second electric motor configured to rotate the second wheel; a second motor brake mechanically connected to the second electric motor, the second motor brake configured to slow the elevator car; a third wheel in contact with the first surface of the second guide beam; a third electric motor configured to rotate the third wheel; a third motor brake mechanically connected to the third electric motor, the third motor brake configured to slow the elevator car; a fourth wheel in contact with the second surface of the second guide beam; a fourth electric motor configured to rotate the fourth wheel; a fourth motor brake mechanically connected to the fourth electric motor, the fourth motor brake configured to slow the elevator car, wherein the brake condition based monitoring system is configured to detect when second motor brake is dragging, detect when the third motor brake is dragging, and detect when the fourth motor brake is dragging.

In addition to one or more of the features described herein, or as an alternative, further embodiments may include that the brake condition based monitoring system is configured to detect when the second motor brake is dragging based upon at least a torque of the second electric motor.

In addition to one or more of the features described herein, or as an alternative, further embodiments may include a first guide rail extending vertically through the elevator shaft, wherein the beam climber system further includes: a first guide rail brake operably connected to the first guide rail, wherein the brake condition monitoring system is configured to detect when the first guide rail brake is dragging based upon at least the torque of the first electric motor and the torque of the second electric motor.

In addition to one or more of the features described herein, or as an alternative, further embodiments may include a second guide rail extending vertically through the elevator shaft, wherein the beam climber system further includes: a second guide rail brake operably connected to the second guide rail, wherein the brake condition monitoring system is configured to detect when the second guide rail brake is dragging based upon at least a torque of the third electric motor and a torque of the fourth electric motor.

In addition to one or more of the features described herein, or as an alternative, further embodiments may include a floor pressure sensor configured to determine a center of gravity of the elevator car, wherein the brake condition based monitoring system is configured to detect at least one of when the first motor brake is dragging, detect when the second motor brake is dragging, detect when the third motor brake is dragging, or detect when the fourth motor brake is dragging based upon at least the torque of the first electric motor, a torque of the second electric motor, a torque of the third electric motor, a torque of the fourth electric motor, and the center of gravity.

In addition to one or more of the features described herein, or as an alternative, further embodiments may include that the brake condition monitoring system is configured to normalize the torque of the first electric motor, the second electric motor, the third electric motor, and the fourth electric motor based on the center of gravity of the elevator car.

According to another embodiment, a method of detecting brake drag within an elevator system is provided. The method including: rotating, using a first electric motor of a beam climber system, a first wheel, the first wheel being in contact with a first surface of a first guide beam that extends vertically through an elevator shaft; moving, using the beam climber system, an elevator car through the elevator shaft when the first wheel of the beam climber system rotates along the first surface of the first guide beam; detecting, using a brake condition based monitoring system, when a first motor brake is dragging.

In addition to one or more of the features described herein, or as an alternative, further embodiments may include detecting a torque of the first electric motor, wherein the brake condition based monitoring system is configured to detect when the first motor brake is dragging based upon at least a torque of the first electric motor.

In addition to one or more of the features described herein, or as an alternative, further embodiments may include that detecting a center of gravity of the elevator car, wherein the brake condition based monitoring system is configured to detect when the first motor brake is dragging based upon at least a torque of the first electric motor and the center of gravity.

In addition to one or more of the features described herein, or as an alternative, further embodiments may include that normalizing the torque of the first electric motor based on the center of gravity of the elevator car.

In addition to one or more of the features described herein, or as an alternative, further embodiments may include that rotating, using a second electric motor of the beam climber system, a second wheel, the second wheel being in contact with a second surface of the first guide beam; moving, using the beam climber system, the elevator car through the elevator shaft when the first wheel of the beam climber system rotates along the first surface of the first guide beam and the second wheel of the beam climber system rotates along the second surface of the first guide beam; detecting, using the brake condition based monitoring system, at least one of when the first motor brake is dragging or when the second motor brake is dragging.

In addition to one or more of the features described herein, or as an alternative, further embodiments may include wherein the elevator system further includes a first guide rail extending vertically through the elevator shaft, wherein the beam climber system further includes a first guide rail brake operably connected to the first guide rail, wherein the method further includes: detecting, using the brake condition monitoring system, when the first guide rail brake is dragging based upon at least a torque of the first electric motor and a torque of the second electric motor.

According to another embodiment, a method of detecting brake drag within an elevator system is provided. The method including: detecting a load within an elevator car; determining a center of gravity of the elevator car; determining a predicted motor torque of an electric motor of a beam climber assembly during a constant speed of the elevator car; adjusting a motor torque detection range for the electric motor based on the load within the elevator car and the center of gravity; moving the elevator car, using the beam climber system, for an elevator run and recording the motor torque experienced by the electric motor during a constant speed portion of the elevator run; detecting whether the motor torque experienced by the electric motor during the constant speed portion of the elevator run was outside of the motor torque detection range that was adjusted based on the load within the elevator car and the center of gravity; and activating an alert if the motor torque experienced by the electric motor during the constant speed portion of the elevator run was outside of the motor torque detection range that was adjusted based on the load within the elevator car and the center of gravity.

Technical effects of embodiments of the present disclosure include testing brakes of a beam climber system by detecting increased motor torque on one of the electric motors driving the wheels.

The foregoing features and elements may be combined in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION OF THE DRAWINGS

The present disclosure is illustrated by way of example and not limited in the accompanying figures in which like reference numerals indicate similar elements.

DETAILED DESCRIPTION

Figure 1:
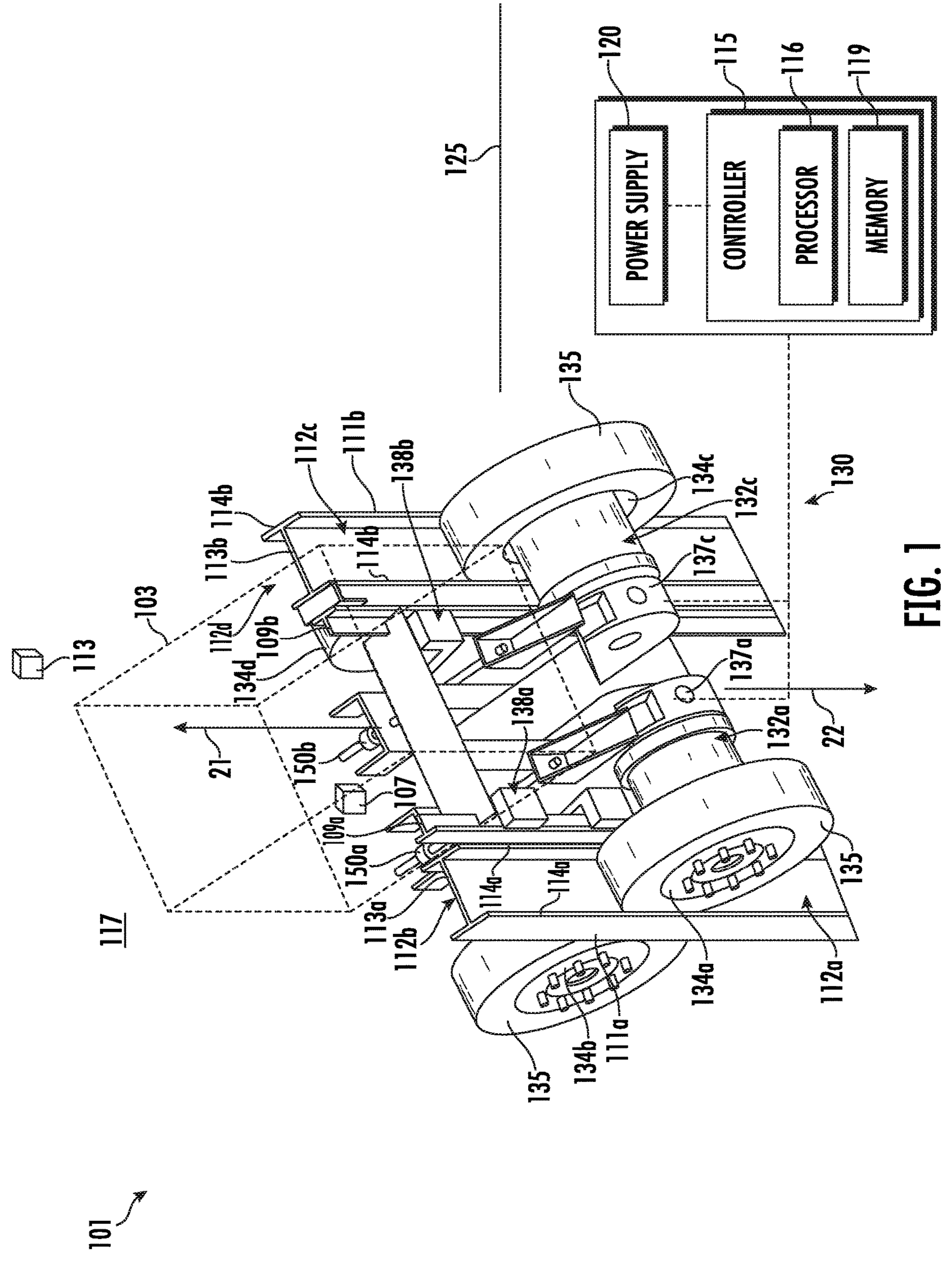
FIG. 1 is a schematic illustration of an elevator system with a beam climber system, in accordance with an embodiment of the disclosure.

FIG. 1 is a perspective view of an elevator system 101 including an elevator car 103, a beam climber system 130, a controller 115, and a power source 120. Although illustrated in FIG. 1 as separate from the beam climber system 130, the embodiments described herein may be applicable to a controller 115 included in the beam climber system 130 (i.e., moving through an elevator shaft 117 with the beam climber system 130) and may also be applicable to a controller located off of the beam climber system 130 (i.e., remotely connected to the beam climber system 130 and stationary relative to the beam climber system 130). Although illustrated in FIG. 1 as separate from the beam climber system 130, the embodiments described herein may be applicable to a power source 120 included in the beam climber system 130 (i.e., moving through the elevator shaft 117 with the beam climber system 130) and may also be applicable to a power source located off of the beam climber system 130 (i.e., remotely connected to the beam climber system 130 and stationary relative to the beam climber system 130).

The beam climber system 130 is configured to move the elevator car 103 within the elevator shaft 117 and along guide rails 109*a*, 109*b* that extend vertically through the elevator shaft 117. In an embodiment, the guide rails 109*a*, 109*b* are T-beams. The beam climber system 130 includes one or more electric motors 132*a*, 132*c*. The electric motors 132*a*, 132*c* are configured to move the beam climber system 130 within the elevator shaft 117 by rotating one or more wheels 134*a*, 134*c* that are pressed against a guide beam 111*a*, 111*b*. In an embodiment, the guide beams 111*a*, 111*b* are I-beams. It is understood that while an I-beam is illustrated, any beam or similar structure may be utilized with the embodiment described herein. Friction between the wheels 134*a*, 134*b*, 134*c*, 134*d* driven by the electric motors 132*a*, 132*c* allows the wheels 134*a*, 134*b*, 134*c*, 134*d* to climb up 21 and down 22 the guide beams 111*a*, 111*b*. The guide beam extends vertically through the elevator shaft 117. It is understood that while two guide beams 111*a*, 111*b* are illustrated, the embodiments disclosed herein may be utilized with one or more guide beams. It is also understood that while two electric motors 132*a*, 132*c* are illustrated, the embodiments disclosed herein may be applicable to beam climber systems 130 having one or more electric motors. For example, the beam climber system 130 may have one electric motor for each of the four wheels 134*a*, 134*b*, 134*c*, 134*d*. The electrical motors 132*a*, 132*c* may be permanent magnet electrical motors, asynchronous motor, or any electrical motor known to one of skill in the art. In other embodiments, not illustrated herein, another configuration could have the powered wheels at two different vertical locations (i.e., at bottom and top of an elevator car 103).

The first guide beam 111*a* includes a web portion 113*a* and two flange portions 114*a*. The web portion 113*a* of the first guide beam 111*a* includes a first surface 112*a* and a second surface 112*b* opposite the first surface 112*a*. A first wheel 134*a* is in contact with the first surface 112*a* and a second wheel 134*b* is in contact with the second surface 112*b*. The first wheel 134*a* may be in contact with the first surface 112*a* through a tire 135 and the second wheel 134*b* may be in contact with the second surface 112*b* through a tire 135. The first wheel 134*a* is compressed against the first surface 112*a* of the first guide beam 111*a* by a first compression mechanism 150*a* and the second wheel 134*b* is compressed against the second surface 112*b* of the first guide beam 111*a* by the first compression mechanism 150*a*. The first compression mechanism 150*a* compresses the first wheel 134*a* and the second wheel 134*b* together to clamp onto the web portion 113*a* of the first guide beam 111*a*. The first compression mechanism 150*a* may be a metallic or elastomeric spring mechanism, a pneumatic mechanism, a hydraulic mechanism, a turnbuckle mechanism, an electromechanical actuator mechanism, a spring system, a hydraulic cylinder, a motorized spring setup, or any other known force actuation method. The first compression mechanism 150*a* may be adjustable in real-time during operation of the elevator system 101 to control compression of the first wheel 134*a* and the second wheel 134*b* on the first guide beam 111*a*. The first wheel 134*a* and the second wheel 134*b* may each include a tire 135 to increase traction with the first guide beam 111*a*.

The first surface 112*a* and the second surface 112*b* extend vertically through the shaft 117, thus creating a track for the first wheel 134*a* and the second wheel 134*b* to ride on. The flange portions 114*a* may work as guardrails to help guide the wheels 134*a*, 134*b* along this track and thus help prevent the wheels 134*a*, 134*b* from running off track.

The first electric motor 132*a* is configured to rotate the first wheel 134*a* to climb up 21 or down 22 the first guide beam 111*a*. The first electric motor 132*a* may also include a first motor brake 137*a* to slow and stop rotation of the first electric motor 132*a*. The first motor brake 137*a* may be mechanically connected to the first electric motor 132*a*. The first motor brake 137*a* may be a clutch system, a disc brake system, a drum brake system, a brake on a rotor of the first electric motor 132*a*, an electronic braking, an Eddy current brakes, a Magnetorheological fluid brake or any other known braking system. The beam climber system 130 may also include a first guide rail brake 138*a* operably connected to the first guide rail 109*a*. The first guide rail brake 138*a* is configured to slow movement of the beam climber system 130 by clamping onto the first guide rail 109*a*. The first guide rail brake 138*a* may be a caliper brake acting on the first guide rail 109*a* on the beam climber system 130, or caliper brakes acting on the first guide rail 109 proximate the elevator car 103.

The second guide beam 111*b* includes a web portion 113*b* and two flange portions 114*b*. The web portion 113*b* of the second guide beam 111*b* includes a first surface 112*c* and a second surface 112*d* opposite the first surface 112*c*. A third wheel 134*c* is in contact with the first surface 112*c* and a fourth wheel 134*d* is in contact with the second surface 112*d*. The third wheel 134*c* may be in contact with the first surface 112*c* through a tire 135 and the fourth wheel 134*d* may be in contact with the second surface 112*d* through a tire 135. A third wheel 134*c* is compressed against the first surface 112*c* of the second guide beam 111*b* by a second compression mechanism 150*b* and a fourth wheel 134*d* is compressed against the second surface 112*d* of the second guide beam 111*b* by the second compression mechanism 150*b*. The second compression mechanism 150*b* compresses the third wheel 134*c* and the fourth wheel 134*d* together to clamp onto the web portion 113*b* of the second guide beam 111*b*. The second compression mechanism 150*b* may be a spring mechanism, turnbuckle mechanism, an actuator mechanism, a spring system, a hydraulic cylinder, and/or a motorized spring setup. The second compression mechanism 150*b* may be adjustable in real-time during operation of the elevator system 101 to control compression of the third wheel 134*c* and the fourth wheel 134*d* on the second guide beam 111*b*. The third wheel 134*c* and the fourth wheel 134*d* may each include a tire 135 to increase traction with the second guide beam 111*b*.

The first surface 112*c* and the second surface 112*d* extend vertically through the shaft 117, thus creating a track for the third wheel 134*c* and the fourth wheel 134*d* to ride on. The flange portions 114*b* may work as guardrails to help guide the wheels 134*c*, 134*d* along this track and thus help prevent the wheels 134*c*, 134*d* from running off track.

The third electric motor 132*c* is configured to rotate the third wheel 134*c* to climb up 21 or down 22 the second guide beam 111*b*. The third electric motor 132*c* may also include a third motor brake 137*c* to slow and stop rotation of the third electric motor 132*c*. The third motor brake 137*c* may be mechanically connected to the third electric motor 132*c*. The third motor brake 137*c* may be a clutch system, a disc brake system, drum brake system, a brake on a rotor of the second electric motor 132*b*, an electronic braking, an Eddy current brake, a Magnetorheological fluid brake, or any other known braking system. The beam climber system 130 includes a second guide rail brake 138*b* operably connected to the second guide rail 109*b*. The second guide rail brake 138*b* is configured to slow movement of the beam climber system 130 by clamping onto the second guide rail 109*b*. The second guide rail brake 138*b* may be a caliper brake acting on the first guide rail 109*a* on the beam climber system 130, or caliper brakes acting on the first guide rail 109 proximate the elevator car 103.

The elevator system 101 may also include a position reference system 113. The position reference system 113 may be mounted on a fixed part at the top of the elevator shaft 117, such as on a support or guide rail 109, and may be configured to provide position signals related to a position of the elevator car 103 within the elevator shaft 117. In other embodiments, the position reference system 113 may be directly mounted to a moving component of the elevator system (e.g., the elevator car 103 or the beam climber system 130), or may be located in other positions and/or configurations as known in the art. The position reference system 113 can be any device or mechanism for monitoring a position of an elevator car within the elevator shaft 117, as known in the art. For example, without limitation, the position reference system 113 can be an encoder, sensor, accelerometer, altimeter, pressure sensor, range finder, or other system and can include velocity sensing, absolute position sensing, etc., as will be appreciated by those of skill in the art.

The controller 115 may be an electronic controller including a processor 116 and an associated memory 119 comprising computer-executable instructions that, when executed by the processor 116, cause the processor 116 to perform various operations. The processor 116 may be, but is not limited to, a single-processor or multi-processor system of any of a wide array of possible architectures, including field programmable gate array (FPGA), central processing unit (CPU), application specific integrated circuits (ASIC), digital signal processor (DSP) or graphics processing unit (GPU) hardware arranged homogenously or heterogeneously. The memory 119 may be but is not limited to a random access memory (RAM), read only memory (ROM), or other electronic, optical, magnetic or any other computer readable medium.

The controller 115 is configured to control the operation of the elevator car 103 and the beam climber system 130. For example, the controller 115 may provide drive signals to the beam climber system 130 to control the acceleration, deceleration, leveling, stopping, etc. of the elevator car 103.

The controller 115 may also be configured to receive position signals from the position reference system 113 or any other desired position reference device.

When moving up 21 or down 22 within the elevator shaft 117 along the guide rails 109*a*, 109*b*, the elevator car 103 may stop at one or more landings 125 as controlled by the controller 115. In one embodiment, the controller 115 may be located remotely or in the cloud. In another embodiment, the controller 115 may be located on the beam climber system 130.

The power supply 120 for the elevator system 101 may be any power source, including a power grid and/or battery power which, in combination with other components, is supplied to the beam climber system 130. In one embodiment, power source 120 may be located on the beam climber system 130. In an embodiment, the power supply 120 is a battery that is included in the beam climber system 130.

The elevator system 101 may also include an accelerometer 107 attached to the elevator car 103 or the beam climber system 130. The accelerometer 107 is configured to detect an acceleration and/or a speed of the elevator car 103 and the beam climber system 130.

Figure 2:
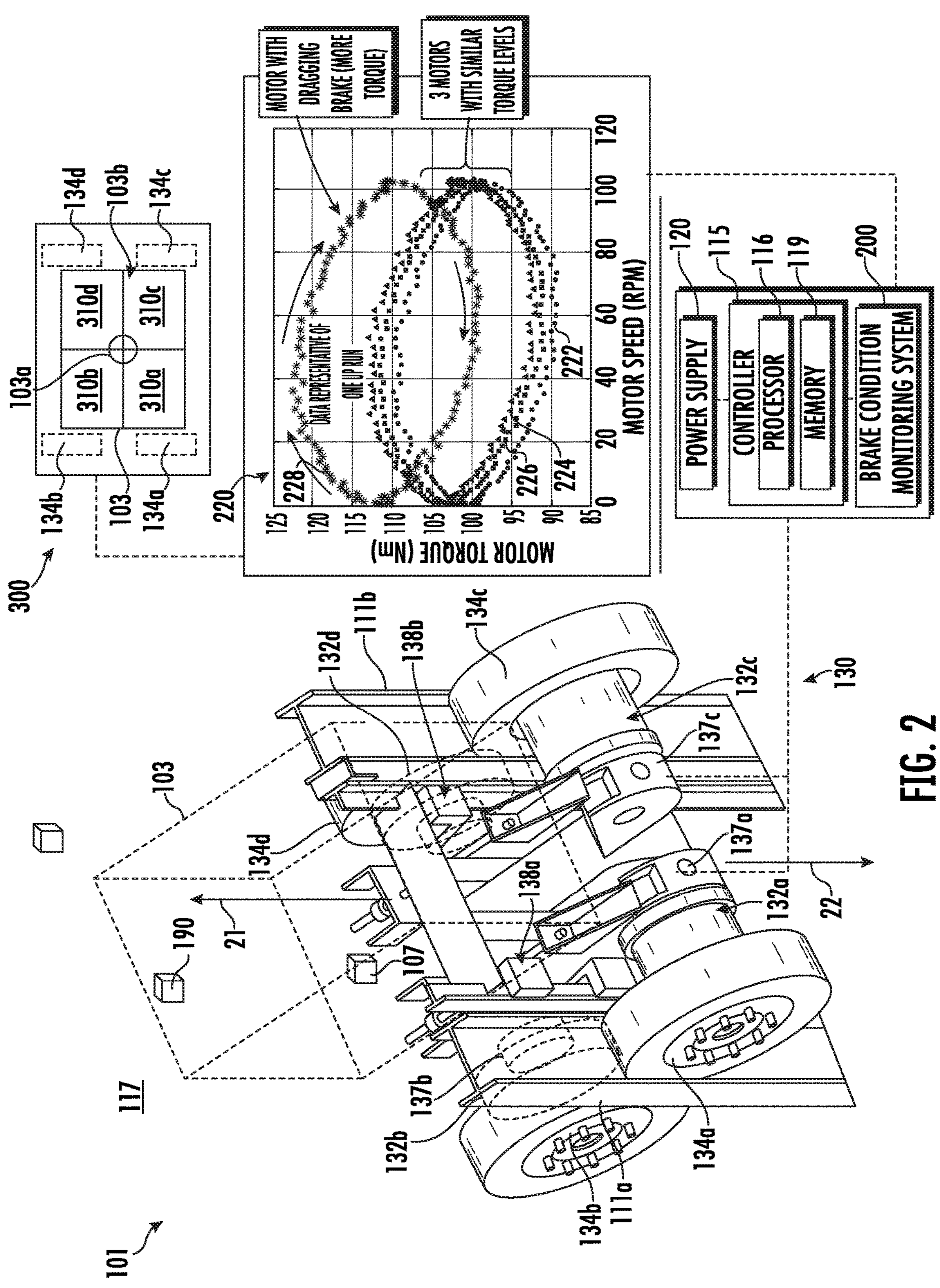
FIG. 2 illustrates a schematic view of a brake condition based monitoring system, in accordance with an embodiment of the disclosure.

Referring now to FIG. 2, with continued reference to FIG. 1, a brake condition based monitoring system 200 is illustrated, in accordance with an embodiment of the present disclosure. It should be appreciated that, although particular systems are separately defined in the schematic block diagrams, each or any of the systems may be otherwise combined or separated via hardware and/or software. In one embodiment, the brake condition based monitoring system 200 may be a separate hardware module in electronic communication with the controller 115. The separate hardware module may be local or remote (e.g., software as a service). In another embodiment, the brake condition based monitoring system 200 may be software installed directly on the memory 119 of the controller 115 and the software may consist of operations to be performed by the processor 116.

The elevator system 101 includes at least one brake 137*a*, 137*b*, 137*c*, 137*d*, 138*a*, 138*b* configured to slow the elevator car 103. The brake condition based monitoring system 200 is configured to assess the health and braking force or torque of brakes 137*a*, 137*b*, 137*c*, 137*d*, 138*a*, 138*b* of the beam climber system 130. Specifically, the brake condition based monitoring system 200 is configured to determine a brake health of the brakes 137*a*, 137*b*, 137*c*, 137*d*, 138*a*, 138*b* of the beam climber system 130. More specifically, the brake condition based monitoring system 200 is configured to determine whether the brake does not have adequate clearance with its associated braking surface (i.e., whether the brake sticking). The brakes 137*a*, 137*b*, 137*c*, 137*d*, 138*a*, 138*b* of the beam climber system 130 includes the first motor brake 137*a*, a second motor brake 137*b*, the third motor brake 137*c*, a fourth motor brake 137*d*, the first guide rail brake 138*a*, and the second guide rail brake 138*b*.

The beam climber system also includes a second electric motor 132*b* configured to move the beam climber system 130 by rotating the second wheel 134*b* and a fourth electric motor 132*d* configured to move the beam climber system 130 by rotating the fourth wheel 134*d*. The first wheel 134*a* and the second wheel 134*b* are pressed against the first guide beam 111*a*. The third wheel 134*c* and the fourth wheel 134*d* is pressed up against the second guide beam 111*b*.

Friction between the wheels 134*a*, 134*b*, 134*c*, 134*d* driven by the electric motors 132*a*, 132*b*, 132*b*, 132*c* allows the wheels 134*a*, 134*b*, 134*c*, 134*d* to climb up 21 and down 22 the guide beams 111*a*, 111*b*. The guide beam extends vertically through the elevator shaft 117. It is understood that while two guide beams 111*a*, 111*b* are illustrated, the embodiments disclosed herein may be utilized with one or more guide beams. The electrical motors 132*a*, 132*b*, 132*c*, 134*d* may be permanent magnet electrical motors, asynchronous motor, or any electrical motor known to one of skill in the art.

The second electric motor 132*b* is configured to rotate the second wheel 134*b* to climb up 21 or down 22 the first guide beam 111*a*. The second electric motor 132*b* may also include a second motor brake 137*b* to slow and stop rotation of the second electric motor 132*b*. The second motor brake 137*b* may be mechanically connected to the second electric motor 132*b*. The second motor brake 137*b* may be a clutch system, a disc brake system, a drum brake system, a brake on a rotor of the first electric motor 132*a*, an electronic braking, an Eddy current brakes, a Magnetorheological fluid brake or any other known braking system.

The fourth electric motor 132*d* is configured to rotate the fourth wheel 134*d* to climb up 21 or down 22 the second guide beam 111*b*. The fourth electric motor 132*d* may also include a fourth motor brake 137*d* to slow and stop rotation of the fourth electric motor 132*d*. The fourth motor brake 137*d* may be mechanically connected to the fourth electric motor 132*d*. The fourth motor brake 137*d* may be a clutch system, a disc brake system, a drum brake system, a brake on a rotor of the first electric motor 132*a*, an electronic braking, an Eddy current brakes, a Magnetorheological fluid brake or any other known braking system.

The brake condition based monitoring system 200 is configured to detect when a braking clearance of the first motor brake 137*a* is less than a prescribed braking clearance for the first motor brake 137*a* (i.e., when the first motor brake 137*a* is dragging), when a braking clearance of the second motor brake 137*b* is less than a prescribed braking clearance for the second motor brake 137*b*(i.e., when the second motor brake 137*b* is dragging), when a braking clearance of the third motor brake 137*c* is less than a prescribed braking clearance for the third motor brake 137*c* (i.e., when the third motor brake 137*d* is dragging), when a braking clearance of the fourth motor brake 137*d* is less than a prescribed braking clearance for the fourth motor brake 137*d* (i.e., when the fourth motor brake 137*d* is dragging), when a braking clearance of the first guide rail brake 138*a* is less than a prescribed braking clearance for the first guide rail brake 138*a* (i.e., when the first guide rail brake 138*a* is dragging), and/or a braking clearance of the second guide rail brake 138*b* is less than a prescribed braking clearance for the second guide rail brake 138*b* (i.e., when the second guide rail brake 138*a* is dragging) based upon at least a torque of the first electric motor 132*a*, the second electric motor 132*b*, third electric motor 132*c*, and/or the fourth electric motor 132*d*. The torque on each electric motor 132*a*, 132*b*, 132*b*, 132*c* may be measured based upon the electric voltage being sent to each electric motor 132*a*, 132*b*, 132*b*, 132*c*. Torque may also be monitored using a sensor, such as strain gauge. From a detection of abnormal torque, it may be inferred that there is a lack of adequate clearance for a brake 137*a*, 137*b*, 137*c*, 137*d*, 138*a*, 138*b* or in other words the brake 137*a*, 137*b*, 137*c*, 137*d*, 138*a*, 138*b* is dragging.

In an example, a torque v. motor speed chart 220 illustrates a torque 222 of the first electric motor 132*a*, a torque 224 of the second electric motor 132*b*, a torque 226 of the third electric motor 132*c*, and/or a torque 228 the fourth electric motor 132*d*. If commanded by the controller 115 to rotate at the same speed the first electric motor 132*a*, second electric motor 132*b*, the third electric motor 132*c*, and the fourth electric motor 132*d* should each see relatively the same torque. When the torque of one electric motor is higher than the torque on the other electric motors, it may indicate that the motor with the higher torque may be experiencing increase drag, which may be caused by a dragging brake or in other words a brake with a braking clearance that is less than a prescribed braking clearance. For example, the torque v. motor speed chart 220 illustrates the torque 228 on the fourth electric motor 132*d* being higher than the torque 222 of the first electric motor 132*a*, the torque 224 of the second electric motor 132*b*, and the torque 226 of the third electric motor 132*c*, thus this may be indicative that the fourth motor brake 137*d* is dragging or sticking. Conversely, when moving downwards, a motor 137*a*, 137*b*, 137*c*, 137*d* with less torque may indicate a dragging brake 137*a*, 137*b*, 137*c*, 137*d*, 138*a*, 138*b*.

The brake conditioning system 200 may be configured to take into account other parameters that may cause an increase in torque on the electric motors 132*a*, 132*b*, 132*b*, 132*c*, such as, for example passenger loads within the elevator car. For example, the if all the passengers in the elevator car 103 are located in the portion of the elevator car 103 proximate the first electric motor 132*a*, that may cause increased torque on the first electric motor 132*a*. This may be expected in pairs of motors 132*a*, 132*b*, 132*b*, 132*c* with wheels 134*a*, 134*b*, 134*c*, 134*d* pinching the same guide beam 111*a*, 111*b*.

The elevator car 103 may include a floor pressure sensor, which may be one or more pressure sensors located in the floor of an elevator car 103 that utilizes pressure data on the floor to detect a human and/or an object within the elevator car 103 to help determine a center of gravity 103*a* of the elevator car 103 and a load with the elevator car 103. The floor pressure sensor generates a pressure map for analysis. Another load weighing system that can be used to isolate the center of the elevator car 103 load is to put load cells under the car platform at various locations. For example, the load weighing system may include four load cells spaced in a rectangular arrangement (e.g., front/left, front/right, back/left, back/right) and from the readings of these load cells the total force in the car and its X/Y location can be resolved. It is understood that any other desired load measurement system may be utilized. Further the loads within the elevator car 103 may be measure when the elevator car is stationary to obtain a baseline load measurement.

As shown in the center of gravity chart 300, the brake conditioning system 200 may determine the center of gravity 103*a* of the elevator car 103. If the center of gravity 103*a* shifts closer towards any wheel 134*a*, 134*b*, 134*c*, 134*d*, (as measured on a floor 103*b* of the elevator car 103) then that may increase torque on the electric motor 132*a*, 132*b*, 132*c*, 132*d* of the wheel 134*a*, 134*b*, 134*c*, 134*d*. The brake conditioning system 200 may break down the elevator car 103 into four quadrants 310*a*, 310*b*, 310*c*, 310*d* including a first quadrant 310*a*, a second quadrant 310*b*, a third quadrant 310*c*, and a fourth quadrant 310*d* and calculate the loads in each of the first quadrant 310*a*, the second quadrant 310*b*, the third quadrant 310*c*, and the fourth quadrant 310*d* in order to determine the center of gravity 103*a* of the elevator car 103.

The brake condition monitoring system 200 may be configured to normalize the effect of that the center of gravity 103*a* of the elevator car 103 may have on the torque 222 of the first electric motor 132*a*, the torque 224 of the second electric motor 132*b*, the torque 226 of the third electric motor 132*c*, and the torque 228 the fourth electric motor 132*d*. By normalizing the effect of the center of gravity 103*a*, the brake condition monitoring system 200 may then attribute excess torque on any particular electric motor 132*a*, 132*b*, 132*b*, 132*c* to the braking clearance being less than the prescribed braking clearance of the respective motor brake 137*a*, 137*b*, 137*c*, 137*d*, or in other words the motor brake 137*a*, 137*b*, 137*c*, 137*d* is sticking or dragging.

If two motors 132*a*, 132*b*, 132*c*, 132*d* on the same guide beam 109*a*, 109*b* are experiencing a similar increase in torque then it may indicate that the proximate guide rail brake 138*a*, 138*b* has a braking clearance being less than the prescribed braking clearance of the respective guide rail brake 138*a*, 138*b*. In one example, if the first electric motor 132*a* and the second electric motor 132*b* are experiencing similar increases in torque than either the first guide rail brake 138*a* may be sticking and/or the first motor brake 137*a* and the third motor break 137*b* may be sticking. In another example, if the third electric motor 132*c* and the fourth electric motor 132*c* are experiencing similar increases in torque than either the second guide rail brake 138*b* may be sticking and/or the third motor brake 137*c* and the fourth motor brake 137*d* may be sticking.

Figure 3:
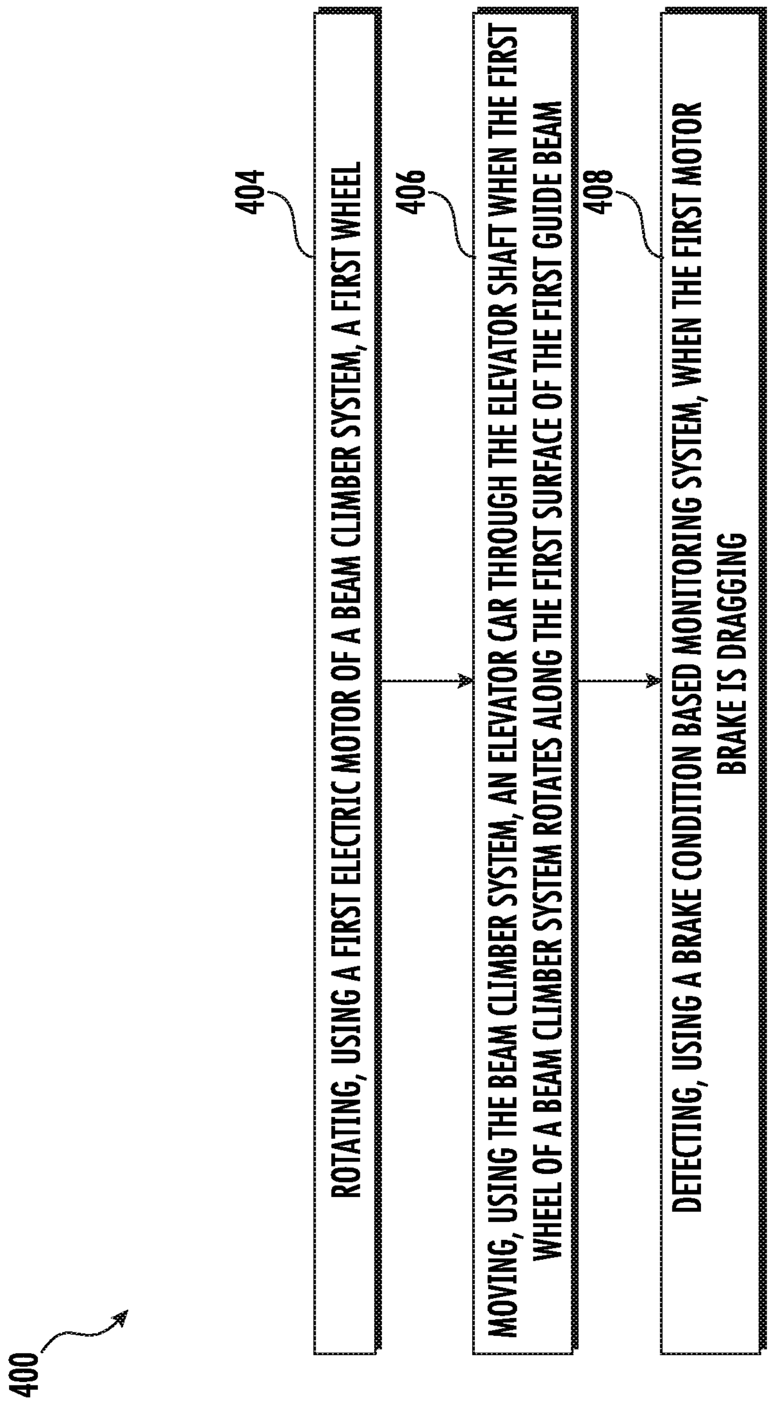
FIG. 3 is a flow chart of method of detecting brake drag within an elevator system, in accordance with an embodiment of the disclosure.

Referring now to FIG. 3, with continued reference to FIGS. 1-2, a flow chart of method 400 of detecting brake drag within an elevator systems 101 is illustrated, in accordance with an embodiment of the disclosure.

At block 404, a first electric motor 132*a* of a beam climber system 130 rotates a first wheel 134*a*. The first wheel 134*a* being in contact with a first surface 112_a_ of a first guide beam 111_a_ that extends vertically through an elevator shaft 117.

At block 406, the beam climber system 130 moves an elevator car 103 through the elevator shaft when the first wheel 134_a_ of the beam climber system 130 rotates along the first surface 112_a_ of the first guide beam 111_a_.

At block 408, a brake condition based monitoring system 200 detects when the first motor brake 137_a_ is dragging (i.e., when a braking clearance of the first motor brake 137_a_ is less than a prescribed braking clearance of the first motor brake 137_a_) based upon at least a torque of the first electric motor 132_a_.

The method 400 may further comprise a center of gravity 103_a_ of the elevator car 103. The brake condition based monitoring system 200 is configured to detect when the first motor brake 137_a_ is dragging (i.e., when a braking clearance of the first motor brake 137_a_ is less than a prescribed braking clearance of the first motor brake 137_a_) based upon at least a torque of the first electric motor 132_a_ and the center of gravity 103_a_.

The method 400 may further comprise that the torque of the first electric motor 132_a_ is normalized based on the center of gravity 103_a_ of the elevator car 103.

The method 400 may further comprise that a second electric motor 132_b_ of a beam climber system rotates a second wheel 134_b_. The second wheel 134_b_ being in contact with a second surface of a first guide beam 111_a_. The beam climber system moves the elevator car 103 through the elevator shaft 117 when the first wheel 134_a_ of the beam climber system rotates along the first surface of the first guide beam 111_a_ and the second wheel 134_b_ of the beam climber system rotates along the second surface of the first guide beam 111_a_. The brake condition based monitoring system 200 detects at least one of when the first motor brake 137_a_ is dragging (i.e., when a braking clearance of a first motor brake 137_a_ is less than a prescribed braking clearance of the first motor brake 137_a_) or when the third motor brake 137_c_ is dragging (i.e., when a braking clearance of a third motor brake 137_c_ is less than a prescribed braking clearance of the third motor brake 137_c_).

The method 400 may further comprise that the brake condition monitoring system detects when the first guide rail brake 138_a_ is dragging (i.e., when the braking clearance of the first guide rail 109_a_ brake is less than a prescribed braking clearance of the first guide rail brake 138_a_) based upon at least a torque of the first electric motor 132_a_ and the torque of the second electric motor 132_b_.

The method 400 may further include that a second electric motor 132_b_ of a beam climber system rotates a second wheel 134_b_, a third electric motor 132_c_ of a beam climber system rotates a third wheel 134_c_, and a fourth electric motor 132_d_ rotates a fourth wheel 134_d_. The second wheel 134_b_ being in contact with a second surface of the first guide beam 111_a_, the third wheel 134_c_ being in contact with a first surface of a second guide beam 111_b_ that extends vertically through the elevator shaft 117, and the fourth wheel 134_d_ being in contact with a second surface of the second guide beam 111_b_. The beam climber system move the elevator car 103 through the elevator shaft 117 when the first wheel 134_a_ of the beam climber system rotates along the first surface of the first guide beam 111_a_, the second wheel 134_b_ of the beam climber system rotates along the second surface of the first guide beam 111_a_, the third wheel 134_c_ rotates along the first surface of the second guide beam 111_b_, and the fourth wheel 134_d_ rotates along the second surface of the second guide beam 111_b_. The brake condition based monitoring system 200 detects at least one of when the first motor brake 137_a_ is dragging (i.e., when a braking clearance of a first motor brake 137_a_ is less than a prescribed braking clearance of the first motor brake 137_a_), when the second motor brake 137_b_ is dragging (i.e., when a braking clearance of a second motor brake 137_b_ is less than a prescribed braking clearance of the second motor brake 137_b_), when the third motor brake 137_c_ is dragging (i.e., when a braking clearance of a third motor brake 137_c_ is less than a prescribed braking clearance of the third motor brake 137_c_), or when the fourth motor brake 137_d_ is dragging (i.e., when a braking clearance of a fourth motor brake 137_d_ is less than a prescribed braking clearance of the fourth motor brake 137_d_). While the above description has described the flow process of FIG. 3 in a particular order, it should be appreciated that unless otherwise specifically required in the attached claims that the ordering of the steps may be varied.

Figure 4:
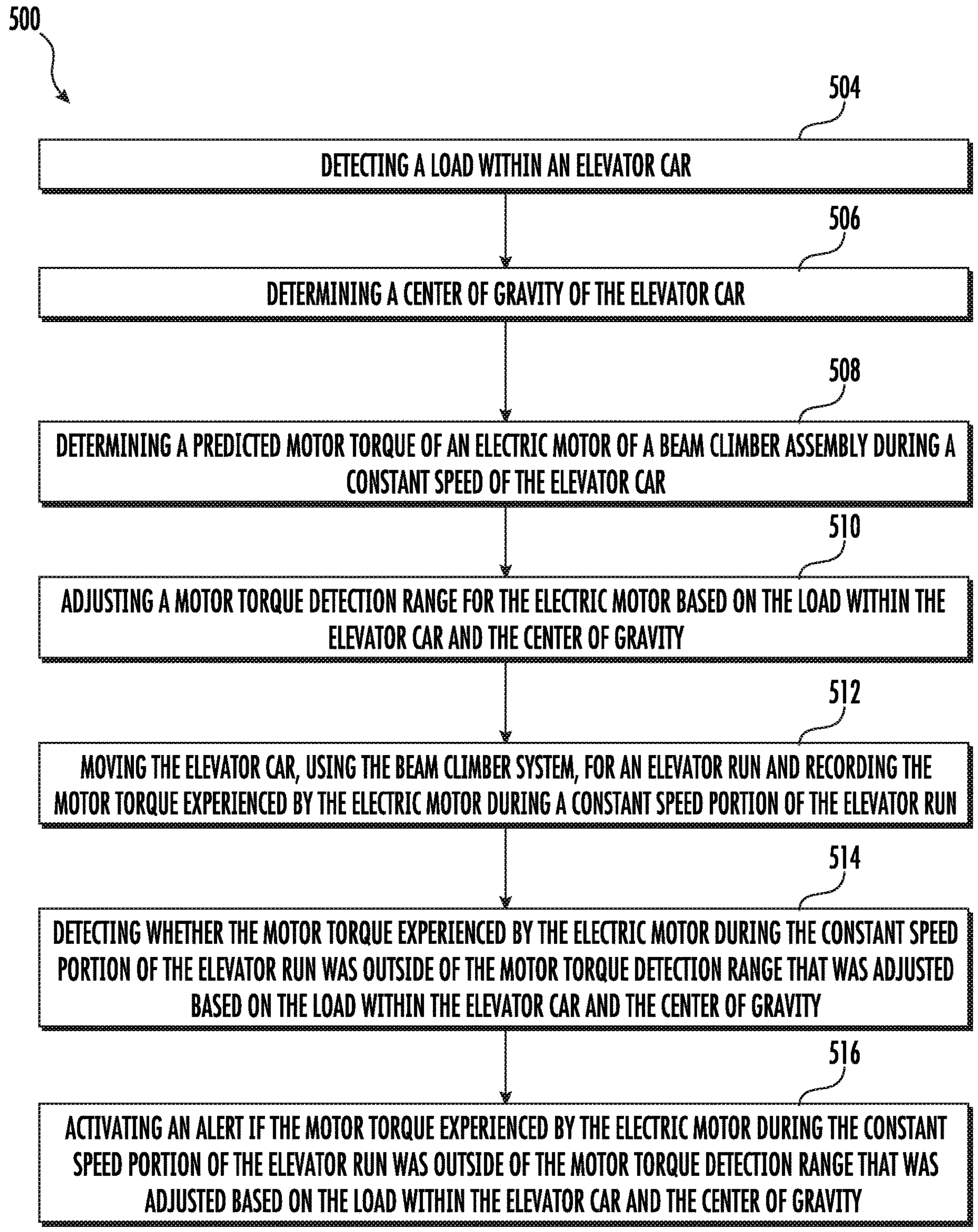
FIG. 4 is a flow chart of method of detecting brake drag within an elevator system, in accordance with an embodiment of the disclosure.

Referring now to FIG. 4, with continued reference to FIGS. 1-2, a flow chart of method 500 of detecting brake drag within an elevator systems 101 is illustrated, in accordance with an embodiment of the disclosure. It is understood that while method 400 discusses the electric motor in the singular, any number of electric motors can be utilized. At block 504, a load within the elevator car 103 is detected. At block 506, the center of gravity 103_a_ of the elevator car 103 is also determined. At block 508, a predicted motor torque of the electric motor 132_a_, 132_b_, 132_c_, 132_d_ during a constant speed of the elevator car 103 is determined. At block 510, a motor torque detection range for the electric motor 132_a_, 132_b_, 132_c_, 132_d_ is adjusted based on the load within the elevator car 103 and the center of gravity 103_a_, or in other words the torque is normalized. At block 512, the beam climber system 130 moves the elevator car 103 for an elevator run and the motor torques experienced by the electric motor 132_a_, 132_b_, 132_c_, 132_d_ is recorded during a constant speed portion of the elevator run. At block 514, It is detected whether the motor torque experienced by the electric motor 132_a_, 132_b_, 132_c_, 132_d_ during the constant speed portion of the elevator run was outside of the motor torque detection range that was adjusted based on the load within the elevator car 103 and the center of gravity 103_a_. At block 516, an alert may be activated if the motor torque experienced by the electric motor 132_a_, 132_b_, 132_c_, 132_d_ during the constant speed portion of the elevator run was outside of the motor torque detection range that was adjusted based on the load within the elevator car 103 and the center of gravity 103_a_

While the above description has described the flow process of FIG. 4 in a particular order, it should be appreciated that unless otherwise specifically required in the attached claims that the ordering of the steps may be varied.

The present invention may be a system, a method, and/or a computer program product at any possible technical detail level of integration. The computer program product may include a computer readable storage medium (or media) having computer readable program instructions thereon for causing a processor to carry out aspects of the present invention.

As described above, embodiments can be in the form of processor-implemented processes and devices for practicing those processes, such as processor. Embodiments can also be in the form of computer program code (e.g., computer program product) containing instructions embodied in tangible media (e.g., non-transitory computer readable medium), such as floppy diskettes, CD ROMs, hard drives, or any other non-transitory computer readable medium, wherein, when the computer program code is loaded into and executed by a computer, the computer becomes a device for practicing the embodiments. Embodiments can also be in the form of computer program code, for example, whether stored in a storage medium, loaded into and/or executed by a computer, or transmitted over some transmission medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an device for practicing the exemplary embodiments. When implemented on a general-purpose microprocessor, the computer program code segments configure the microprocessor to create specific logic circuits.

The term "about" is intended to include the degree of error associated with measurement of the particular quantity and/or manufacturing tolerances based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

Those of skill in the art will appreciate that various example embodiments are shown and described herein, each having certain features in the particular embodiments, but the present disclosure is not thus limited. Rather, the present disclosure can be modified to incorporate any number of variations, alterations, substitutions, combinations, subcombinations, or equivalent arrangements not heretofore described, but which are commensurate with the scope of the present disclosure. Additionally, while various embodiments of the present disclosure have been described, it is to be understood that aspects of the present disclosure may include only some of the described embodiments. Accordingly, the present disclosure is not to be seen as limited by the foregoing description, but is only limited by the scope of the appended claims.

What is claimed is:

1. An elevator system comprising:
- an elevator car configured to travel through an elevator shaft;
- a first guide beam extending vertically through the elevator shaft, the first guide beam comprising a first surface and a second surface opposite the first surface;
- a beam climber system configured to move the elevator car through the elevator shaft, the beam climber system comprising:
  - a first wheel in contact with the first surface; and
  - a first electric motor configured to rotate the first wheel;
  - a first motor brake mechanically connected to the first electric motor, the first motor brake configured to slow the elevator car; and
  - a brake condition based monitoring system configured to detect when the first motor brake is dragging;
  - wherein the brake condition based monitoring system is configured to detect when the first motor brake is dragging based upon at least a torque of the first electric motor;
- the elevator system further comprising a floor pressure sensor configured to determine a center of gravity of the elevator car, wherein the brake condition based monitoring system is configured to detect when the first motor brake is dragging based upon at least the torque of the first electric motor and the center of gravity.

2. The elevator system of claim 1, wherein the brake condition monitoring system is configured to normalize the torque of the first electric motor based on the center of gravity of the elevator car.

3. The elevator system of claim 1, wherein the beam climber system further comprises:
- a second wheel in contact with the second surface;
- a second electric motor configured to rotate the second wheel; and
- a second motor brake mechanically connected to the second electric motor, the second motor brake configured to slow the elevator car,
- wherein the brake condition based monitoring system is configured to detect when the second motor brake is dragging.

4. The elevator system of claim 3, wherein the brake condition based monitoring system is configured to detect when the second motor brake is dragging based upon at least a torque of the second electric motor.

5. The elevator system of claim 4, further comprising:
- a first guide rail extending vertically through the elevator shaft,
- wherein the beam climber system further comprises:
  - a first guide rail brake operably connected to the first guide rail,
  - wherein the brake condition monitoring system is configured to detect when the first guide rail brake is dragging based upon at least a torque of the first electric motor and the torque of the second electric motor.

6. The elevator system of claim 1, further comprising:
- a second guide beam extending vertically through the elevator shaft, the second guide beam comprising a first surface of the second guide beam and a second surface of the second guide beam opposite the first surface of the second guide beam,
- wherein the beam climber system further comprises:
  - a second wheel in contact with the second surface of the first guide beam;
  - a second electric motor configured to rotate the second wheel;
  - a second motor brake mechanically connected to the second electric motor, the second motor brake configured to slow the elevator car;
  - a third wheel in contact with the first surface of the second guide beam;
  - a third electric motor configured to rotate the third wheel;
  - a third motor brake mechanically connected to the third electric motor, the third motor brake configured to slow the elevator car;
  - a fourth wheel in contact with the second surface of the second guide beam;
  - a fourth electric motor configured to rotate the fourth wheel;
  - a fourth motor brake mechanically connected to the fourth electric motor, the fourth motor brake configured to slow the elevator car,
  - wherein the brake condition based monitoring system is configured to detect when second motor brake is dragging, detect when the third motor brake is dragging, and detect when the fourth motor brake is dragging.

7. The elevator system of claim 6, wherein the brake condition based monitoring system is configured to detect when the second motor brake is dragging based upon at least a torque of the second electric motor.

8. The elevator system of claim 6, further comprising:

a first guide rail extending vertically through the elevator shaft, wherein the beam climber system further comprises:

a first guide rail brake operably connected to the first guide rail, wherein the brake condition monitoring system is configured to detect when the first guide rail brake is dragging based upon at least the torque of the first electric motor and the torque of the second electric motor.

9. The elevator system of claim 6, further comprising:

a second guide rail extending vertically through the elevator shaft, wherein the beam climber system further comprises:

a second guide rail brake operably connected to the second guide rail, wherein the brake condition monitoring system is configured to detect when the second guide rail brake is dragging based upon at least a torque of the third electric motor and a torque of the fourth electric motor.

10. The elevator system of claim 6, wherein the brake condition based monitoring system is configured to detect at least one of when the first motor brake is dragging, detect when the second motor brake is dragging, detect when the third motor brake is dragging, or detect when the fourth motor brake is dragging based upon at least the torque of the first electric motor, a torque of the second electric motor, a torque of the third electric motor, a torque of the fourth electric motor, and the center of gravity.

11. The elevator system of claim 10, wherein the brake condition monitoring system is configured to normalize the torque of the first electric motor, the second electric motor, the third electric motor, and the fourth electric motor based on the center of gravity of the elevator car.

12. A method of detecting brake drag within an elevator system, the method comprising:

rotating, using a first electric motor of a beam climber system, a first wheel, the first wheel being in contact with a first surface of a first guide beam that extends vertically through an elevator shaft;

moving, using the beam climber system, an elevator car through the elevator shaft when the first wheel of the beam climber system rotates along the first surface of the first guide beam;

detecting, using a brake condition based monitoring system, when a first motor brake is dragging;

detecting a torque of the first electric motor, wherein the brake condition based monitoring system is configured to detect when the first motor brake is dragging based upon at least a torque of the first electric motor;

normalizing the torque of the first electric motor based on the center of gravity of the elevator car.

13. The method of claim 12, further comprising:

detecting a center of gravity of the elevator car, wherein the brake condition based monitoring system is configured to detect when the first motor brake is dragging based upon at least a torque of the first electric motor and the center of gravity.

14. The method of claim 12, further comprising:

rotating, using a second electric motor of the beam climber system, a second wheel, the second wheel being in contact with a second surface of the first guide beam;

moving, using the beam climber system, the elevator car through the elevator shaft when the first wheel of the beam climber system rotates along the first surface of the first guide beam and the second wheel of the beam climber system rotates along the second surface of the first guide beam; and detecting, using the brake condition based monitoring system, at least one of when the first motor brake is dragging or when the second motor brake is dragging.

15. The method of claim 14, wherein the elevator system further comprises a first guide rail extending vertically through the elevator shaft, wherein the beam climber system further comprises a first guide rail brake operably connected to the first guide rail, wherein the method further comprises:

detecting, using the brake condition monitoring system, when the first guide rail brake is dragging based upon at least a torque of the first electric motor and a torque of the second electric motor.

16. A method of detecting brake drag within an elevator system, the method comprising:

detecting a load within an elevator car;

determining a center of gravity of the elevator car;

determining a predicted motor torque of an electric motor of a beam climber assembly during a constant speed of the elevator car;

adjusting a motor torque detection range for the electric motor based on the load within the elevator car and the center of gravity;

moving the elevator car, using the beam climber system, for an elevator run and recording the motor torque experienced by the electric motor during a constant speed portion of the elevator run;

detecting whether the motor torque experienced by the electric motor during the constant speed portion of the elevator run was outside of the motor torque detection range that was adjusted based on the load within the elevator car and the center of gravity; and activating an alert if the motor torque experienced by the electric motor during the constant speed portion of the elevator run was outside of the motor torque detection range that was adjusted based on the load within the elevator car and the center of gravity.

* * * * *